United States Patent [19]
Kobayashi

[11] Patent Number: 5,535,252
[45] Date of Patent: Jul. 9, 1996

[54] CLOCK SYNCHRONIZATION CIRCUIT AND CLOCK SYNCHRONIZING METHOD IN BASEBAND DEMODULATOR OF DIGITAL MODULATION TYPE

[75] Inventor: Takahiro Kobayashi, Hino, Japan

[73] Assignee: Kabushiki Kaisha Toshiba, Kawasaki, Japan

[21] Appl. No.: 215,818

[22] Filed: Mar. 22, 1994

[30] Foreign Application Priority Data

Mar. 29, 1993 [JP] Japan ..................... 5-070284

[51] Int. Cl.⁶ ............. H04L 7/00; H04L 27/22; H03D 3/22
[52] U.S. Cl. .............. 375/371; 375/330; 375/332; 375/354; 375/355
[58] Field of Search ................. 375/84, 85, 86, 375/106, 118, 330, 331, 332, 354, 355, 371; 364/724.1

[56] References Cited

U.S. PATENT DOCUMENTS

| | | | |
|---|---|---|---|
| 4,392,234 | 7/1983 | Maruta | 375/118 |
| 4,411,006 | 10/1983 | Horna | 375/106 |
| 4,707,841 | 11/1987 | Yen et al. | 375/118 |
| 5,077,531 | 12/1991 | Takeuchi et al. | 375/83 |
| 5,187,719 | 2/1993 | Birgenheier et al. | 375/118 |
| 5,235,622 | 8/1993 | Yoshida | 375/81 |
| 5,309,484 | 5/1994 | McLane et al. | 375/106 |
| 5,365,468 | 11/1994 | Kakubo et al. | 364/724.1 |

*Primary Examiner*—Stephen Chin
*Assistant Examiner*—Vijay Shankar
*Attorney, Agent, or Firm*—Finnegan, Henderson, Farabow, Garrett & Dunner

[57] ABSTRACT

A clock synchronization circuit for use in a baseband demodulator of communication equipment of a digital modulation type, in which detection data is subjected to an interpolating operation with respect to at least one point between adjacent two sample values of the detection data, subjected to a conversion into one-bit data indicative of a positive or negative value, and then passed through a one-bit-input band pass filter to perform phase error detection. Consequently, clock synchronization accuracy is improved while preventing a sampling rate and circuit scale from being made large.

20 Claims, 12 Drawing Sheets

CLOCK SYNCHRONIZATION CIRCUIT AND CLOCK SYNCHRONIZING METHOD IN BASEBAND DEMODULATOR OF DIGITAL MODULATION TYPE

BACKGROUND OF THE INVENTION

1. Field of the Invention

The present invention relates to a baseband demodulator which is installed in a communication equipment based on a digital modulation system to demodulate a baseband signal and more particularly, to a clock synchronization circuit which extracts a phase component from a demodulation timing clock signal and performs phase correction control over a judgement timing clock signal to reduce a judgement error rate of demodulated data, and also to a clock synchronizing method thereof.

2. Description of the Related Art

As known, in such a 4-value digital modulation system as quadrature phase shift keying (QPSK), when it is desired to demodulate a detected signal into a digital value, judgement must be done at correct timing conforming to a modulation frequency.

To this end, it is common practice to divide a clock signal of a demodulator with respect to frequency to generate a judgement timing clock signal. However, since the clock signal of the demodulator is shifted from a clock signal of a modulator with respect to frequency, it becomes necessary to subject the judgement timing clock signal to a phase correction in order to maintain the correct demodulation timing.

For this purpose, a modulator side modulates a bit timing recovery (BTR) pattern and sends it to a demodulation side to inform the demodulator of the demodulation timing; whereas, the demodulation side detects the BTR pattern signal to obtain a BTR pattern detection signal and detects a phase error in the judgement timing clock signal on the basis of the BTR pattern detection signal.

FIG. 12 is a circuit diagram of an exemplary prior art baseband demodulator which includes a clock synchronization circuit for performing phase correction control over the aforementioned judgement timing clock signal.

In the drawing, 8-bit analog/digital converters (which will be referred to merely as the A/D converters, hereinafter) 41 and 42 function to sample orthogonal baseband signals a and b received from a radio frequency (RF) receiver 21 based on a clock signal n corresponding to 8 times the modulation rate (represented by 8fb) to output 8-bit digital data signals c and d respectively.

A delay detector 43 detects the aforementioned data signals c and d at a period of 1/8fb and outputs 8-bit detection data signals e and f.

A judger 44 judges the detection data signals e and f received from the delay detector 43 based on a judgement timing clock signal l to demodulate a 2-value or binary data signal g.

Reference numeral 46a denotes a band pass filter tuned to a modulation frequency. When the detection output signals e and f of the delay detector 43 contain the BTR pattern, the band pass filter 46a has such an operational characteristic that the filter provides a large output, because the detection waveform of the BTR pattern signal has a strong modulation frequency component.

As methods for providing an input to the band pass filter 46a, there are considered methods for inputting either one of the above detection outputs e and f to the filter and for inputting a calculated signal (e–f) to the filter to further improve an S/N ratio.

A phase error detector 47a extracts a demodulation timing (BTR pattern) from the detection output on the basis of an output signal i received from the band pass filter 46a to detect an error with respect to the current judgement timing clock signal l.

A clock reproducer 48 changes the phase of a clock signal having a frequency fb produced at a frequency divider 49 by frequency-dividing a clock signal k applied from the oscillator 5, on the basis of an error signal j received from the phase error detector 47a and outputs its changed result as the judgement timing clock signal l (having the frequency fb).

The clock reproducer 48 further supplies a sampling clock signal n to be used in the A/D converters 41 and 42 and also a bit rate clock signal m (having a frequency 2fb), as clock signals subjected to a phase control in accordance with the phase of the judgement timing clock signal l.

Meanwhile, in this sort of baseband demodulator, since the phase error of the judgement timing clock signal l greatly affects the error rate of a demodulated bit data signal g, the phase error must be controlled with a certain level of accuracy.

For example, in order to keep an accuracy corresponding to 1/8 of the accuracy of the judgement timing signal, the baseband signals a and b are required to be subjected to a sampling operation with the frequency 8fb, which requires the A/D converters 41 and 42 to be both of a high speed type and also the delay detector 43 to be operated at an operational rate of 8fb.

If A/D converters of a low speed are used and the sampling operation is to be carried out with a clock signal having the frequency of 2fb, because only one half of the accuracy of the judgement timing can be obtained, the error rate of the demodulation bit data g becomes considerably worse.

Further, since the necessity of the maintenance of the above accuracy requires the 8-bit-input, infinite-duration impulse-response (IIR or recursive type) digital band pass filter 46a to have an about-20-bit adder and a delay register and also a constant multiplier is required to be of a 20-bit output type, its circuit is inevitably made large in size.

With such a prior art baseband demodulator as mentioned above, in this way, when it is desired to perform phase control of the judgement timing clock signal with an accuracy of 1/8, the orthogonal baseband signals must be sampled with the frequency of 8fb, the A/D converters must be both of a high speed type and the entire demodulator must be operated at the frequency 8fb, which results in that the power consumption of the demodulator is inevitably increased.

Further, there has been a problem that since the digital band pass filter for processing 8-bit input data must be configured with a register, an adder and a multiplier having a large number of bits, the circuit scale becomes large.

SUMMARY OF THE INVENTION

It is an object of the present invention to provide a clock synchronization circuit in a baseband demodulator which can carry out phase correction control over a judgement timing clock signal with a high accuracy while preventing increase of its power consumption and a large-scale circuit.

Another object of the present invention is to provide a clock synchronizing method in a baseband demodulator which can obtain, while keeping a sampling rate to a low level, a synchronization establishment accuracy equivalent to one obtained at a higher sampling rate and which is provided with A/D converters to be operated at a low sampling rate so as to contribute to reduction of its power consumption.

A further object of the present invention is to provide a clock synchronization circuit in a baseband demodulator in which a band pass filter for detecting a BTR pattern contained in detection outputs e and f of a delay detector is required to input and process only a 1-bit signal, which eliminates the need for provision of a register, an adder and a multiplier having a large number of bits, thus contributing to size reduction of the circuit.

In accordance with an aspect of the present invention, the above objects are attained by providing a clock synchronization circuit for use in a baseband demodulator wherein a baseband signal modulated based on a 4-value digital modulation system is sampled at a rate corresponding to twice a modulation rate or more to be converted into a digital data signal, the digital data signal is detected to obtain a detection output, and the detection output is judged based on a judgement timing clock signal to obtain a demodulation data signal, the clock synchronization circuit comprising an interpolation function limiter for subjecting the detection output to an interpolating operation with respect to at least one point between adjacent two sample points of the detection output to output interpolated point data as interpolation value data of one bit indicative of a positive or negative value; digital band pass filter of one bit input type tuned to a modulation frequency for band-limiting an output of the interpolation function limiter; a phase error detector for detecting a phase error in the judgement timing clock signal on the basis of an output of the digital band pass filter; and a clock reproducer for dividing a clock signal received from an oscillator with respect to frequency to generate the judgement timing clock signal and for controlling a phase of the judgement timing clock signal on the basis of a phase error signal received from the phase error detector.

In the present invention, it is desirable that the interpolation function limiter comprises a circuit which outputs a binary rectangular wave signal as the interpolation value data signal on the basis of a sign at the interpolation point between the adjacent 2 sample values of the detection output, and that the interpolation of the interpolation function limiter is linear interpolation and the number of the interpolation points is set to be 3.

In accordance with another aspect of the present invention, there is provided a clock synchronization circuit for use in a baseband demodulator wherein a baseband signal modulated based on a digital modulation system is sampled at a rate corresponding to twice a modulation rate or more to be converted to a digital data signal, the digital data signal is detected to obtain a detection output, and the detection output is judged based on a judgement timing clock signal to obtain a demodulation data signal, the clock synchronization circuit extracting a phase component from a demodulation synchronization signal and controlling a phase of the judgement timing clock signal to perform demodulating operation in synchronism with the demodulation synchronization signal, the clock synchronization circuit comprising signal generation means for subjecting the detection output to an interpolating operation with respect to at least one point between adjacent 2 sample values of the detection output to obtain interpolation value data and for generating on the basis of the interpolation value data the demodulation synchronization signal containing phase information equivalent to one obtained when sampled at the rate corresponding to twice the modulation rate or more; phase error detection means for detecting a phase error between the demodulation synchronization signal generated by the signal generation means and the judgement timing clock signal; and phase control means for performing phase control over the judgement timing clock signal with use of the phase error detected by the phase error detection means.

In accordance with a further aspect of the present invention there is provided a clock synchronizing method in a digital demodulator wherein a baseband signal modulated based on a 4-value digital modulation system is sampled at a rate corresponding to twice a modulation rate or more to be converted to a digital data signal, the digital data signal is detected to obtain a detection output, and the detection output is judged based on a judgement timing clock signal to obtain a demodulation data signal, the method comprising an interpolation step of subjecting the detection output to an interpolating operation with respect to at least one point between adjacent two sample points of the detection output to output interpolated point data as interpolation value data of one bit indicative of a positive or negative value; a band limitation step of subjecting the interpolation value data to a band limiting operation by means of a digital band pass filter tuned to a modulation frequency; a phase error detection step of detecting a phase error in the judgement timing clock signal on the basis of an output of the digital band pass filter; and a phase control step of controlling a phase of the judgement timing clock signal with use of the phase error, wherein a phase component of a demodulation synchronization signal is extracted with use of an interpolation value of sampling data at a certain sampling rate to perform synchronization control with a phase error accuracy equivalent to a sampling result at a sampling rate higher than that certain sampling rate.

As known, with regard to the detection output applied to the band pass filter of the clock synchronization circuit for performing phase correction control over the judgement timing clock signal, its frequency and phase are important but its amplitude is not specifically vital.

In view of the above respect, the present invention is arranged so that the detection output sampled at a frequency corresponding to twice the modulation frequency is subjected to an interpolating operation with respect to at least one point between adjacent two sample values of the detection output and applied to the band pass filter as a binary rectangular wave signal based on the sign of the interpolated value.

When each of the 2 detection outputs sampled at the frequency corresponding, for example, to twice the modulation frequency is subjected, e.g., to a 3-point interpolation, the aforementioned binary rectangular wave signal has 8 sample values when the two detection outputs are considered as a whole and thus has frequency/phase information with an accuracy corresponding substantially to $\frac{1}{8}$ of the modulation period.

Accordingly, when this binary rectangular wave signal is applied to the band pass filter tuned to the modulation frequency, an error detection accuracy necessary for the phase control of the judgement timing clock signal can be made equivalent to one obtained when sampled with a frequency corresponding to 8 times the modulation frequency.

With the baseband demodulator employing the interpolating operation of the present invention, the sampling frequency of the baseband signal can be suppressed to twice the modulation frequency and the operational speed of the delay detector, etc. can also be suppressed to twice the modulation frequency, which results in that the power consumption of the entire demodulator can be reduced.

Further, since a circuit to be provided for the interpolation is only required to have a function of finding only the sign of the interpolation value, the circuit configuration of the demodulator can be made small when compared with such a circuit as to find the actual interpolation value.

Furthermore, since the interpolation output is of a binary 1 bit, the digital band pass filter can be made in the form of such a circuit as to process a 1-bit input, so that delay registers and adders as essential elements of the filter can also made in the form of such a circuit as to be of an about-8-bit input type, whereby a simple clock synchronization circuit can be realized and thus the entire demodulator can be made small in size.

Figure 4:
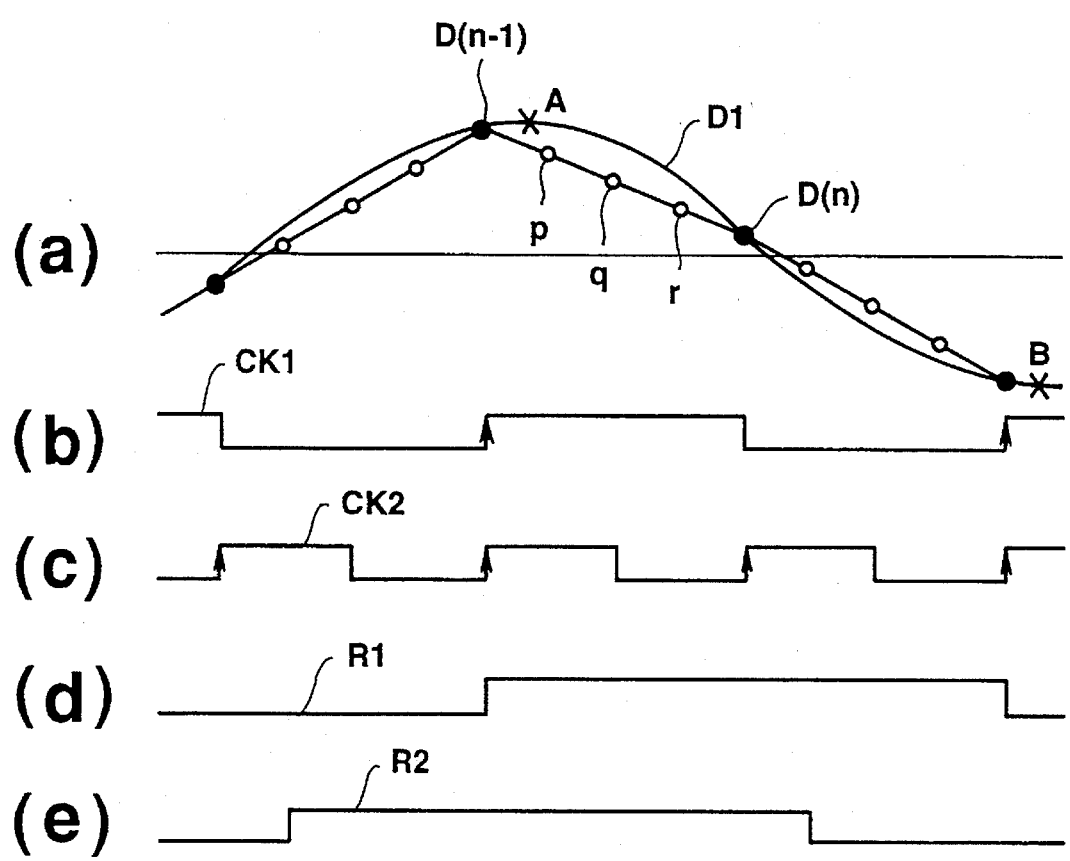
Figure 5:
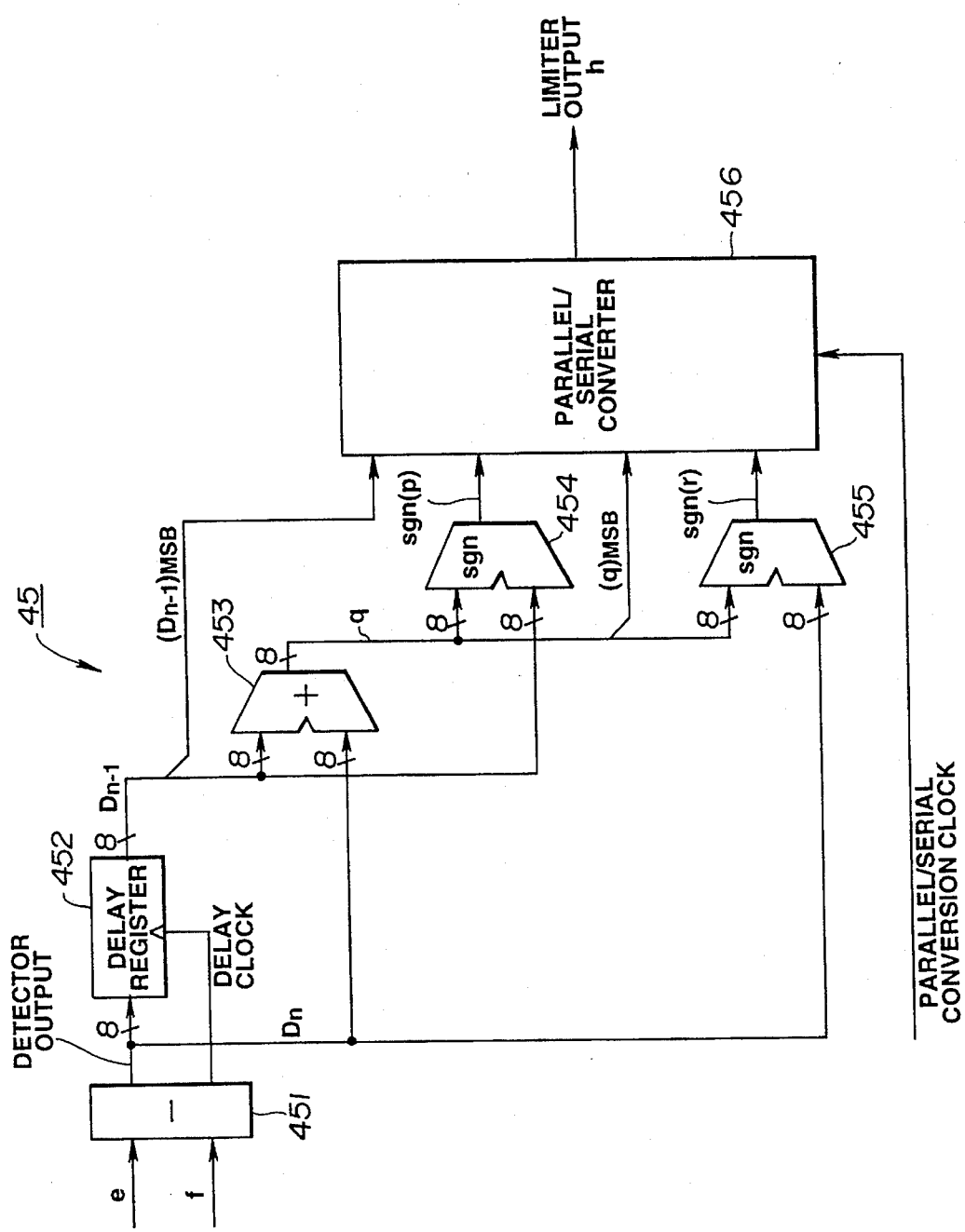
Figure 6:
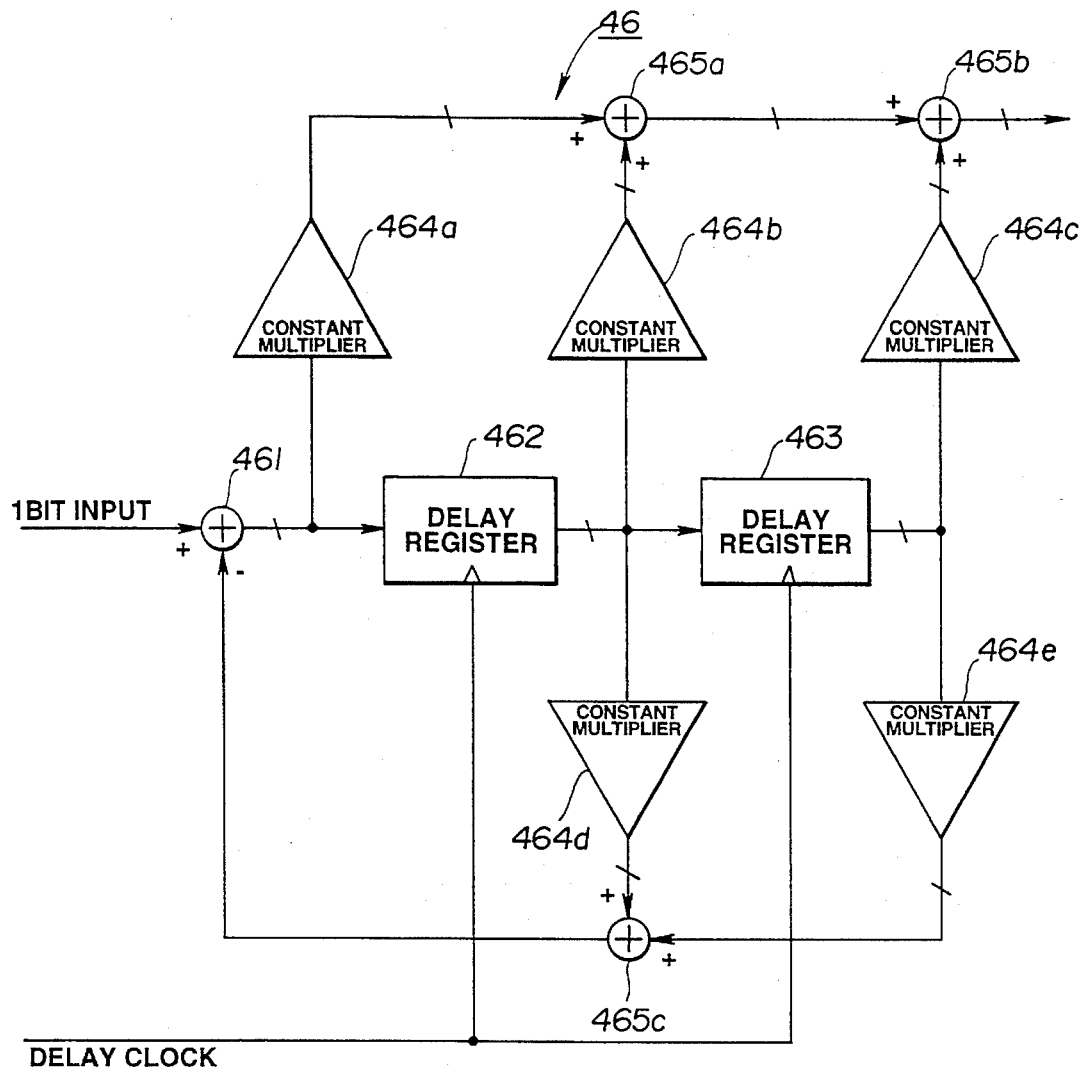
Figure 7:
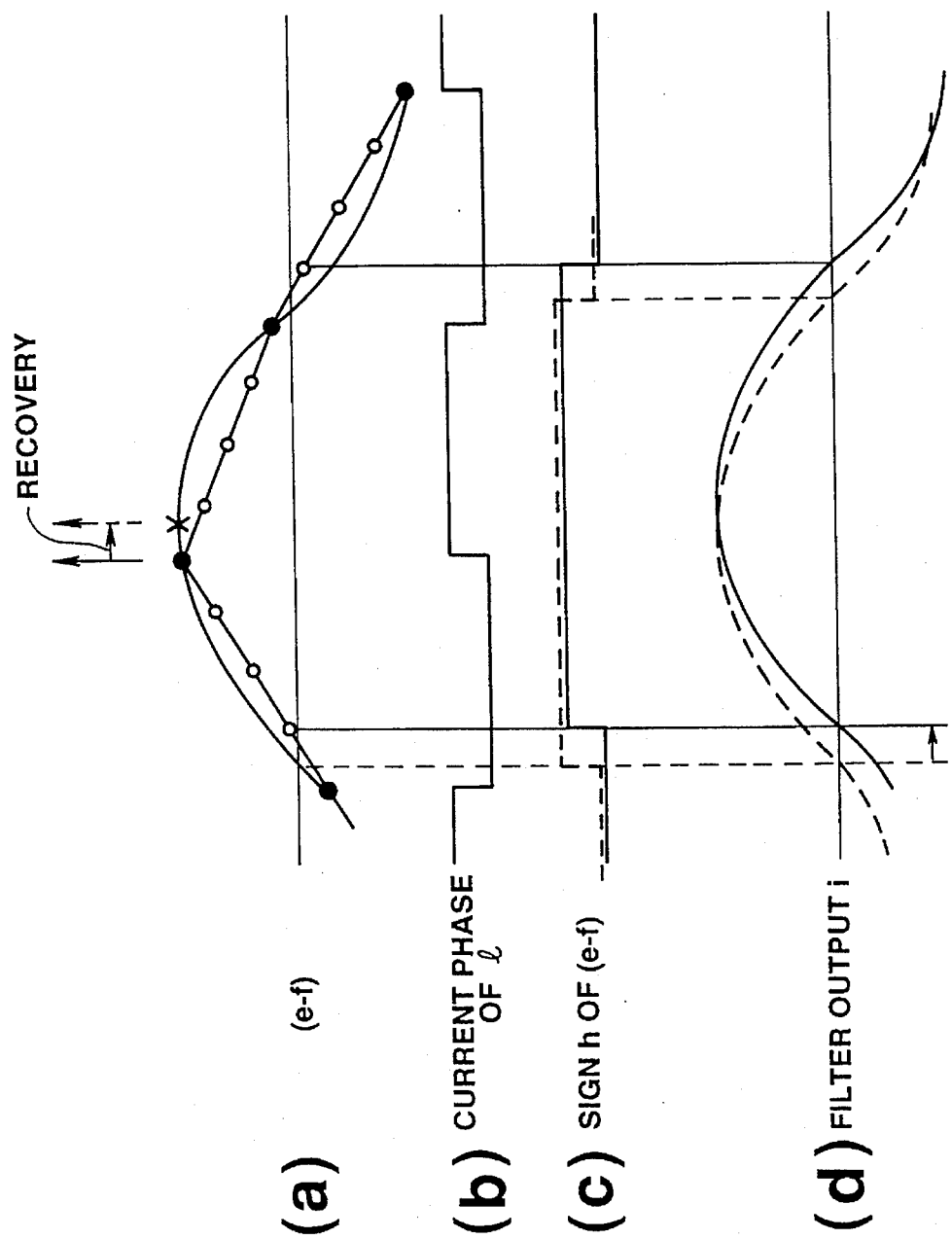
Figure 8:
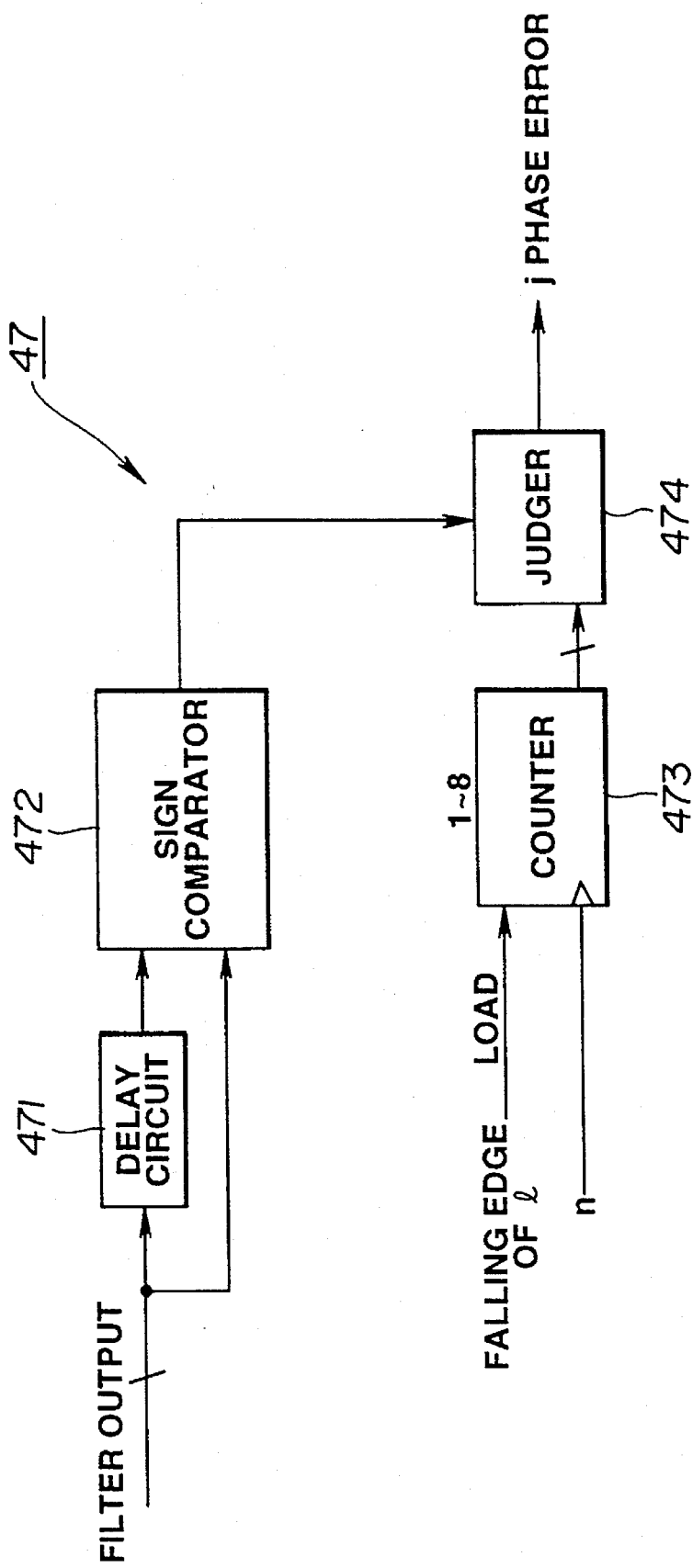
Figure 9:
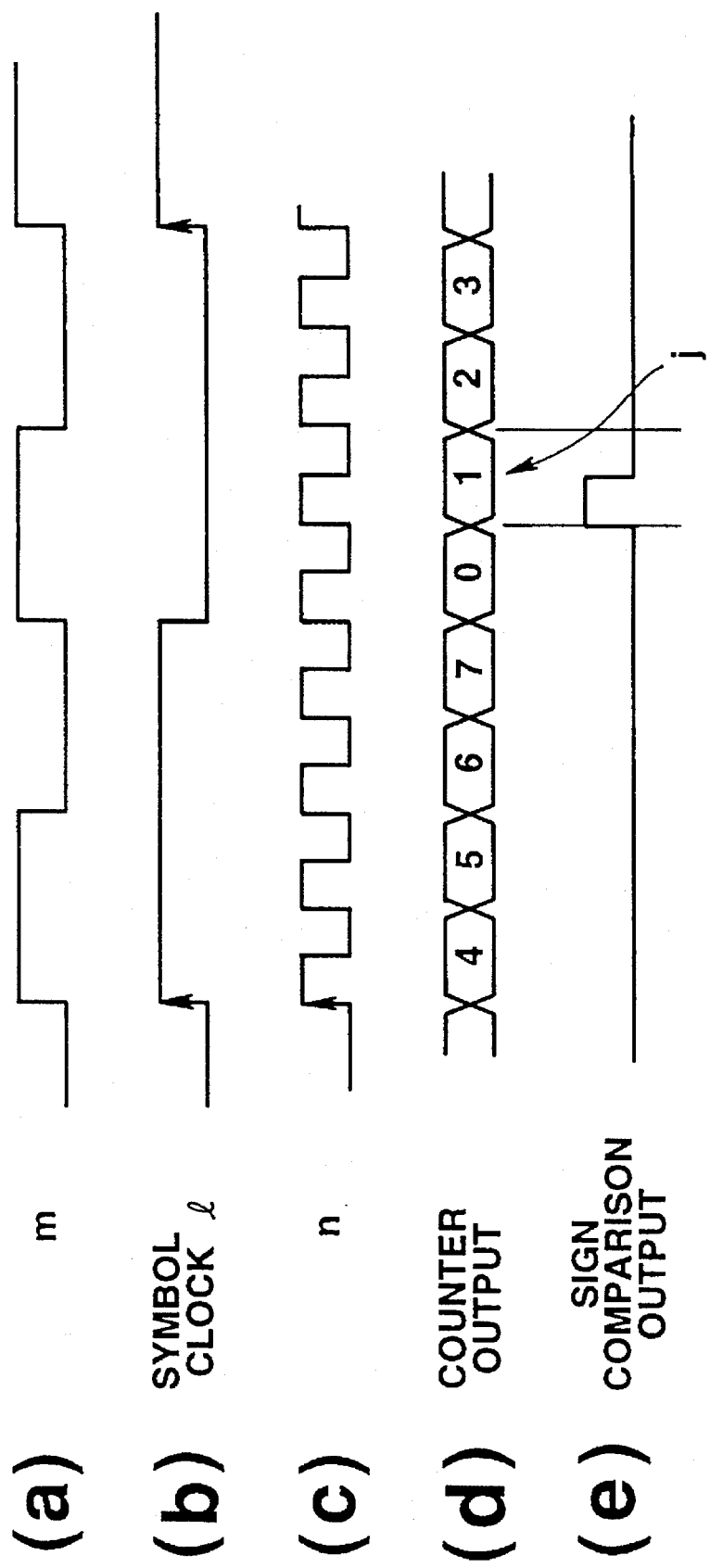
Figure 10:
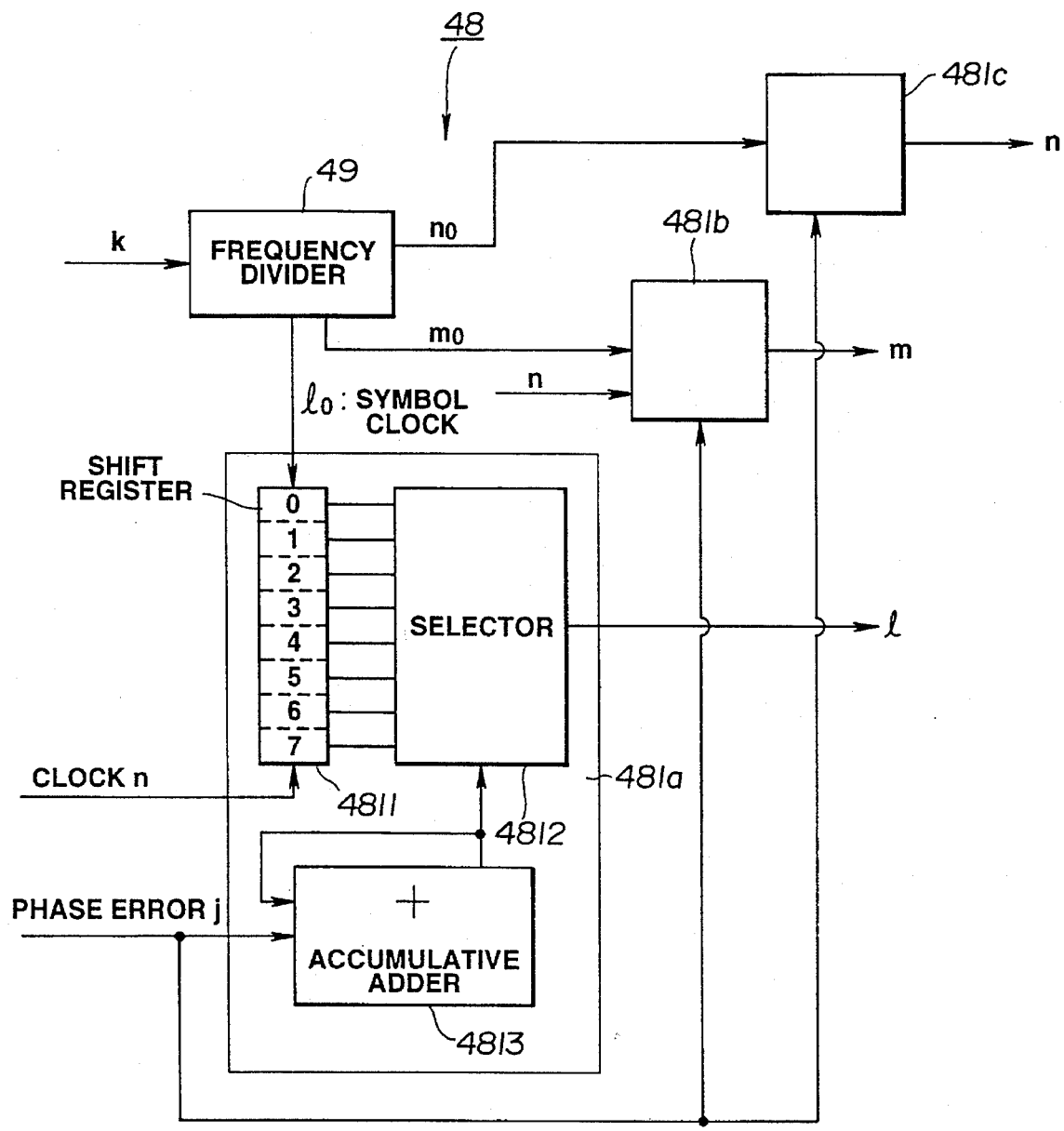
Figure 11:
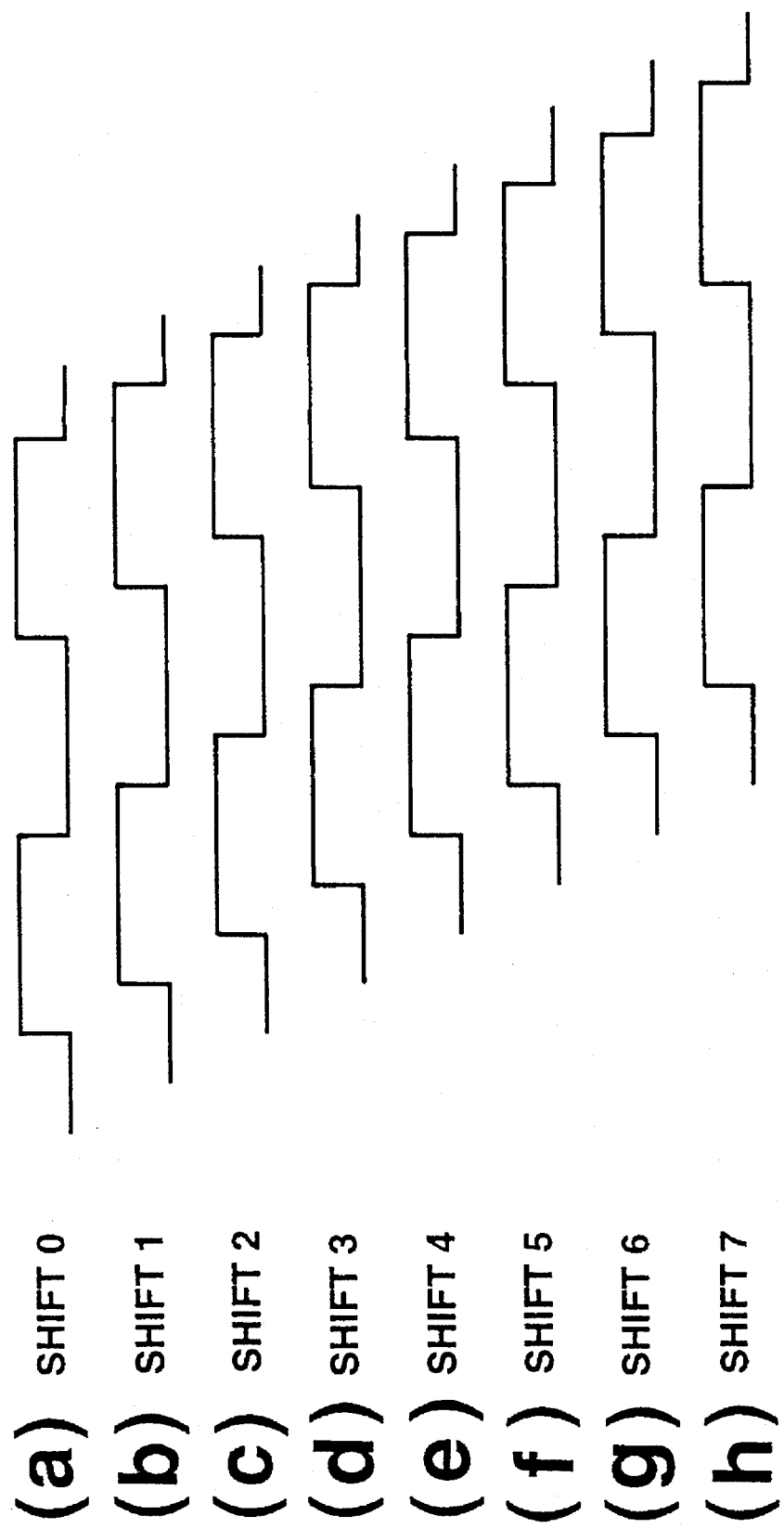
Figure 12:
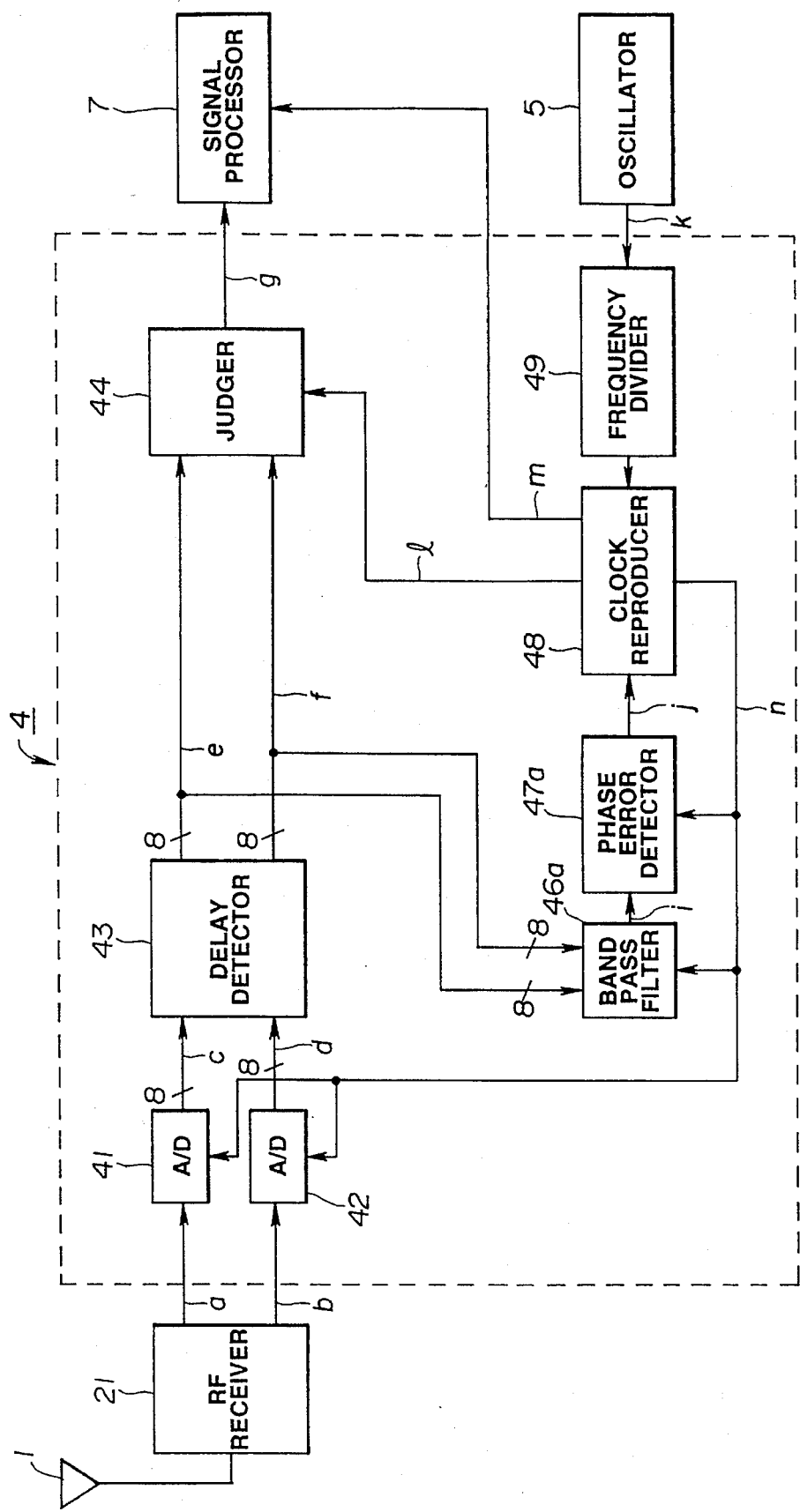

Parts (a) to (e) of FIG. 4 show a timing chart of signals appearing at various points for explaining the operational principle of an interpolation-function limiter in the baseband demodulator of the present invention;

FIG. 5 is a circuit diagram of an example of the interpolation function limiter in the baseband demodulator of the present invention;

FIG. 6 is a block diagram of an example of a band pass filter in the baseband demodulator of the present invention;

Parts (a) to (d) of FIG. 7 show a timing chart of signals appearing at various points for explaining the principle of phase correction control in the baseband demodulator of the present invention;

FIG. 8 is a block diagram of an example of a phase error detector in the baseband demodulator of the present invention;

Parts (a) to (e) of FIG. 9 show a timing chart of operational signals appearing at various points in the phase error detector of FIG. 8;

FIG. 10 is a block diagram of an example of a clock reproducer in the baseband demodulator of the present invention;

Parts (a) to (h) of FIG. 11 show a timing chart of operational signals appearing at various points in the clock reproducer of FIG. 10; and FIG. 12 is a block diagram of an arrangement of a prior art baseband demodulator.

DESCRIPTION OF THE PREFERRED EMBODIMENTS

An embodiment of the present invention will be detailed with reference to the attached drawings.

Figure 1:
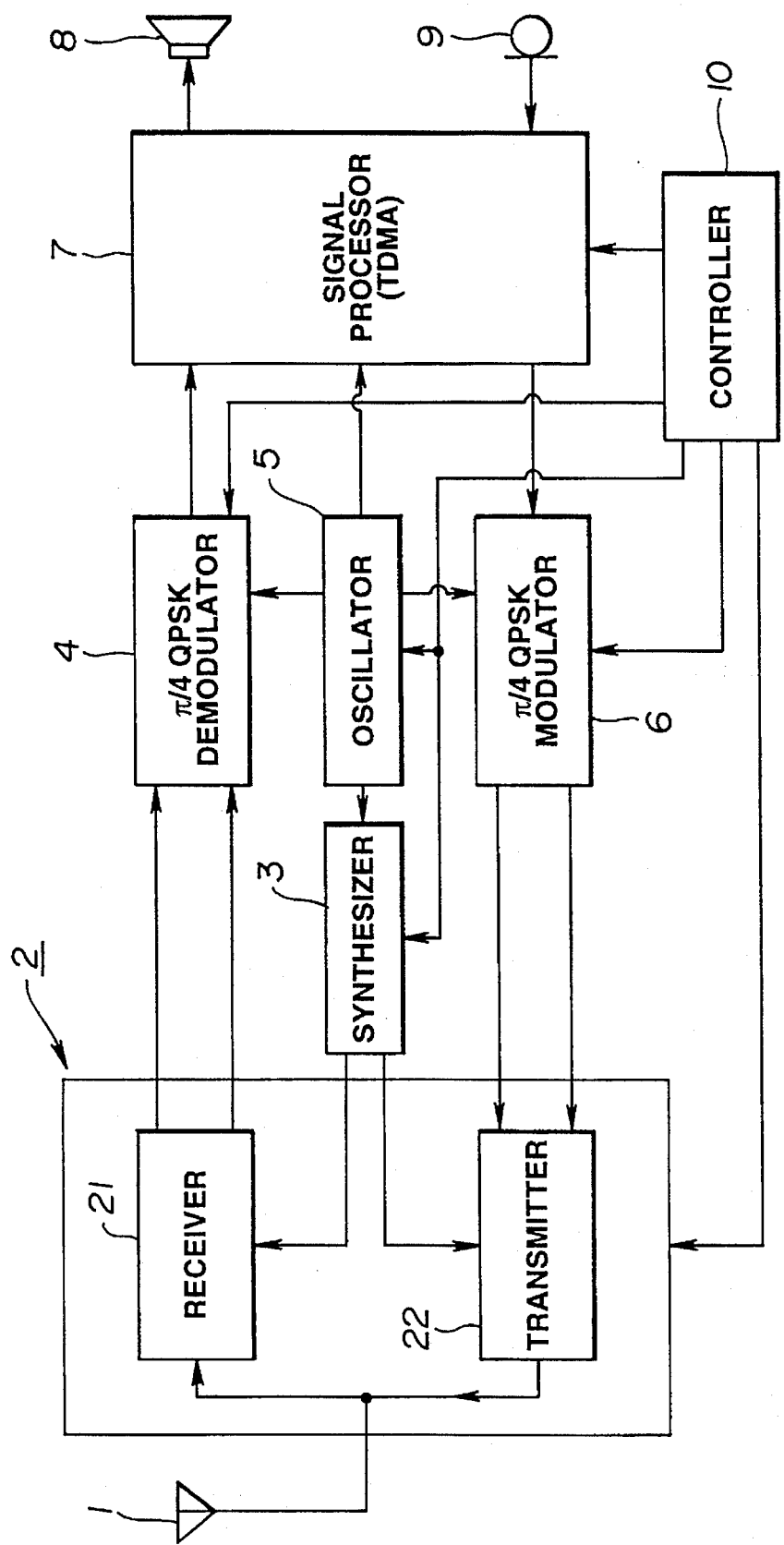
FIG. 1 is a block diagram of an entire arrangement of a radio communication equipment to which a baseband demodulator in accordance with the present invention is applied.

Referring first to FIG. 1, there is shown a block diagram of an entire arrangement of a radio communication equipment in accordance with the present invention, which includes an antenna 1, a radio circuit 2, a synthesizer 3, a π/4 QPSK demodulator 4, an oscillator 5, a π/4 QPSK modulator 6, a signal processor 7, a loudspeaker 8, a microphone 9 and a controller 10.

The present arrangement corresponds to an example in which the present invention is applied to, e.g., a portable telephone set. In this case, a voice signal received from the microphone 9 is sent through the signal processor 7 to the modulator 6 to be modulated therein into a π/4-shift QPSK modulation signal, sent to the radio circuit 2 to be subjected by an orthogonal modulator provided in a transmitter 22 of the radio circuit 2 to an orthogonal modulation with use of two baseband signals, and then sent to the antenna 1 to be transmitted therefrom.

Meanwhile, a π/4-shift QPSK modulation signal received at the antenna 1 is subjected by an orthogonal demodulator provided in a receiver 21 of the radio circuit 2 to an orthogonal demodulation into two baseband signals, which are further subjected at the demodulator 4 to a demodulation into a demodulation data signal, and further sent through the signal processor 7 to the loudspeaker 8 to be reproduced into a voice signal therein.

Figure 2:
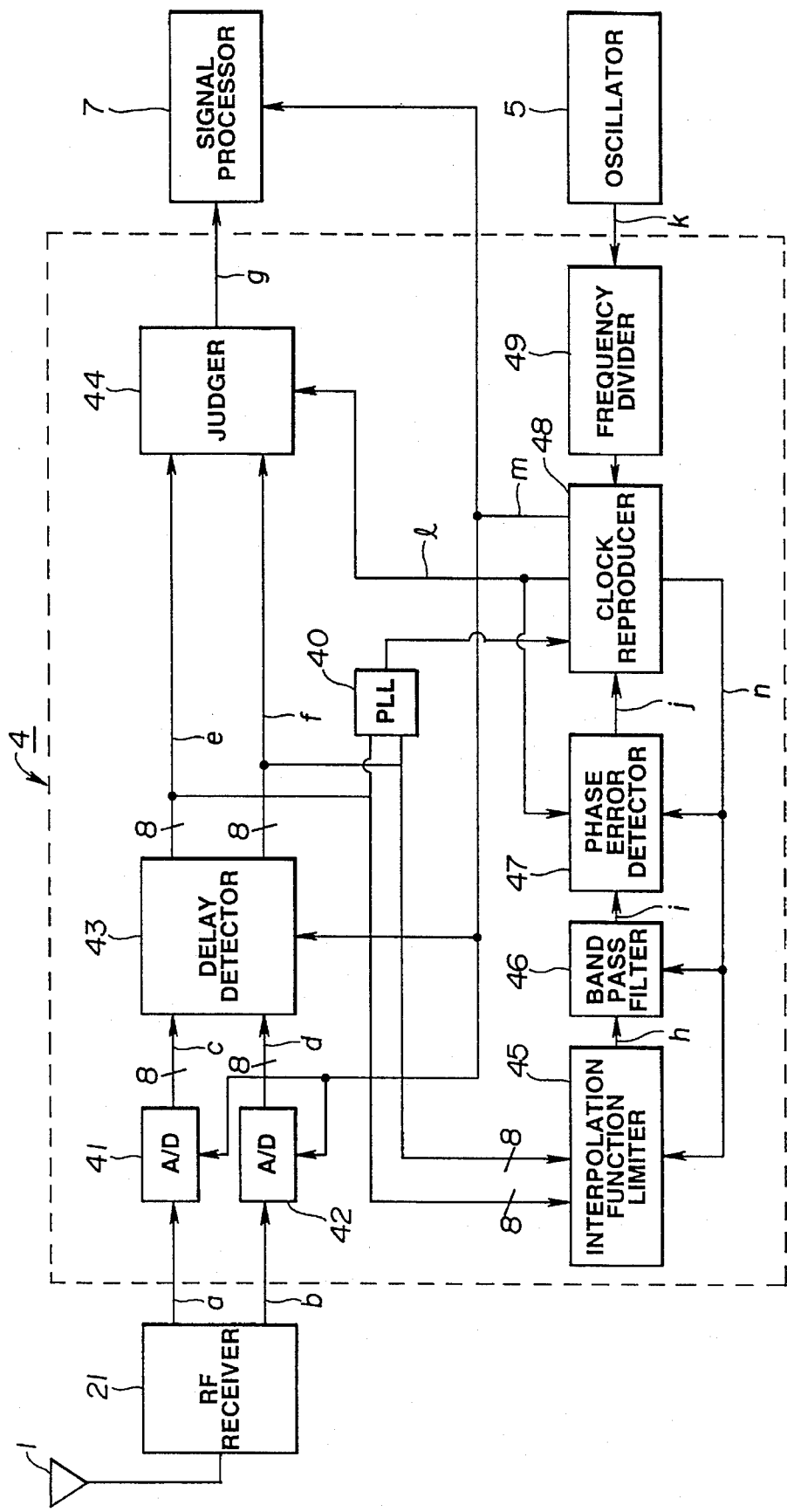
FIG. 2 is a block diagram of an embodiment of the baseband demodulator in the radio communication equipment of FIG. 1.

Shown in FIG. 2 is an embodiment of the baseband demodulator 4 in the radio communication equipment in accordance with the present invention. The present embodiment corresponds to an example in which the present invention is applied to a π/4 differential quaternary phase shift keying (DQPSK) demodulator, and in which circuit parts having substantially the same functions as those in FIG. 12 are denoted by the same reference numerals.

In the drawing, 8-bit A/D converters 41 and 42 sample orthogonal baseband signals a and b received from an RF receiver 21 based on a clock signal m having a frequency of 2fb, and output 8-bit digital data signals c and d.

A delay detector 43 detects the above sampling data signals c and d at a period of ½fb, and outputs 8-bit detection data signals e and f.

A judger 44 judges the detection outputs e and f of the delay detector 43 on the basis of a judgement timing clock signal l and outputs a demodulated binary data signal g.

An interpolation function limiter 45 subjects the detection outputs e and f sampled with the frequency of 2fb to a 3-point interpolating operation of adjacent two data in the outputs to find a sign thereof, and outputs in the form of a binary rectangular wave h sampled with a frequency of 8fb.

Upon generating the binary rectangular wave output h in the interpolation function limiter 45, the limiter 45 may use either one of the detection outputs e and f or use a calculated signal (e−f).

A band pass filter 46, which is of a 1-bit-input, IIR digital type, is tuned to the modulation frequency fb.

A phase error detector 47 extracts a judgement timing (BTR pattern) from the detection outputs by referring to a filter output i received from the band pass filter 46, and detects a phase error j with respect to the current judgement timing clock signal l.

A clock reproducer 48 changes the phase of a clock signal having the frequency fb (which signal is obtained by a frequency divider 49 dividing a clock output signal k of the oscillator 5 with respect to frequency) received from the frequency divider 49 on the basis of the error signal j received from the phase error detector 47, and outputs a phase-changed signal as the aforementioned judgement timing clock signal l.

The clock reproducer 48 also supplies a sampling clock signal n having a frequency of 8fb to the interpolation function limiter 45 and supplies the aforementioned bit rate clock signal m (having the frequency 2fb) to the A/D converts 41 and 42, as clock signals subjected to a phase control in accordance with the phase of the judgement timing clock signal l.

Explanation will next be made as to the detailed operation of the baseband demodulator of the present invention. Explanation will be directed first to the operational principle of the interpolation function limiter 45 by referring to FIGS. 3 and 4.

Figure 3A:
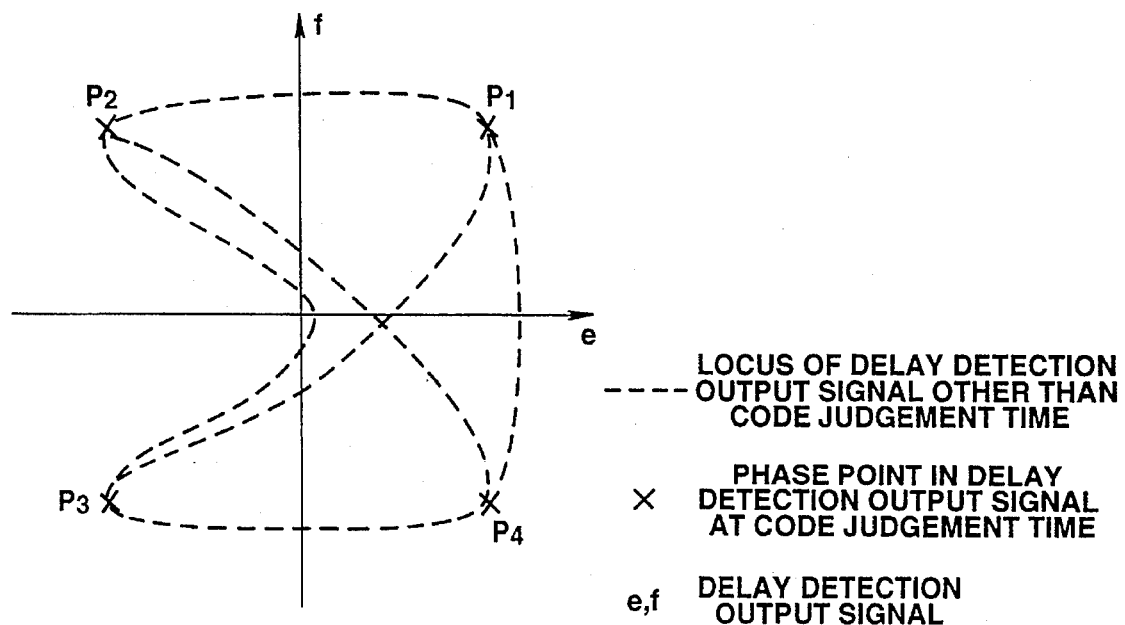
FIGS. 3(a) and 3(b) show phase plane diagrams showing detection output locus in a delay detector in the baseband demodulator of the present invention.

As known, in this sort of communication equipment of a digital modulation type, a baseband signal received in the baseband demodulator varies along such a locus as shown in FIG. 3(a) when monitored in a complex coordinate system.

More specifically, in the π/4-shift QPSK modulation system, since codes of the baseband signals are transmitted with any of 4 phase differences of ±π/4 and ±3π/4, if the above detection output signals e and f are represented on a phase plane, the detection output signals converge, in a case of an ideal signal reception state, in any of 4 phase points P1, P2, P3 and P4 corresponding to the respective codes in code judgement time as shown in FIG. 3(a).

Figure 3B:
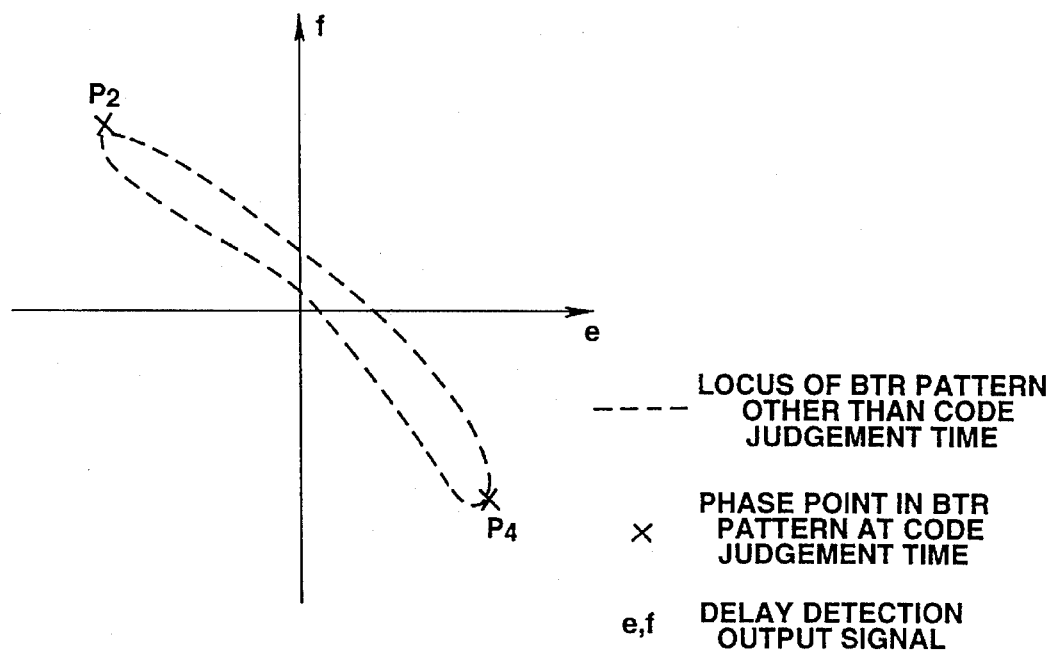

As already mentioned above, the baseband signal contains a BTR pattern for acquirement of the reception judgement timing. When much attention is paid to only the BTR pattern, variation in the pattern draws such a locus as shown in FIG. 3(b).

Assume now that the interpolation function limiter 45 detects a modulation wave of the above BTR pattern. Then, a detected waveform of the modulation wave becomes such a slightly-distorted sinusoidal wave having a period of ½fb as shown by a reference symbol D1 in part (a) of FIG. 4. Optimum as the judgement timing is such a point having the maximum amplitude in the sinusoidal wave as, for example, a point A or B in the drawing.

When such a judgement timing clock signal CK1 as shown in part (b) of FIG. 4 is shifted with respect to phase, such a sampling clock signal CK2 phase-synchronized with the clock signal CK1 as shown in part (c) of FIG. 4 can have sampled data at black dots in part (a) of FIG. 4.

When a binary rectangular wave is generated with use of only the signs of sampled points, there can be obtained such a signal R1 as shown in part (d) of FIG. 4. In this example, the rectangular wave was generated on the assumption that the wave has a high (H) level when the value of the sampled point is positive and has a low (L) level when the value of the sampled point is negative.

If zero-cross took place in the detection wave at points at which the signal R1 changes from its L level to H level and from its H level to L level, then a shift of an actual zero-cross point from the zero-cross point judgeable from the signal R1 corresponds to a phase control error in the above clock signal CK1, in which case an accuracy in the phase control error is ½fb based on the aforementioned sampling period 2fb.

In this connection, it is not vital to reproduce the amplitude of the detection output and it is only required to keep phase and frequency components in the detection output. Thus, when a rectangular wave is generated by subjecting the detection output to a linear interpolating operation between the black dot points (to obtain white dot points in part (a) of FIG. 4) and by using only the white dot points, such a signal R2 as shown in part (e) of FIG. 4 is obtained.

This binary rectangular wave signal R2 is obtained in the present example further by subjecting the adjacent 2 detection outputs sampled at a frequency (2fb) corresponding to twice the modulation frequency to a 3-point interpolating operation, so that, when these 2 detection output waveforms are considered as a whole, the waveforms have a total of 8 sampled values and has frequency and phase information with an accuracy of substantially ⅛ of the modulation period.

With respect to the signal R2 of part (e) of FIG. 4 generated based on the signs of these 8 sampled points, when its phase control error is considered as in the case of the signal R1 of part (d) of FIG. 4, the phase control error has an accuracy of ⅛fb.

More in detail, before sampled points are found based on the above 3-point linear interpolation in the present example, it is assumed that adjacent 2 sampled values to be subjected to the linear interpolating operation are denoted by D(n−1) and D(n) and 3 points between the sampled values are denoted by q, p and r. Then, the 3 points q, p and r are expressed as follows.

$q=[D(n-1)+D(n)]/2$ $p=[D(n-1)+q]/2$ $r=[q+D(n)]/2$

Hence, $sgn(q)=sgn[D(n-1)+D(n)]/2$ $sgn(p)=sgn[D(n-1)+q]$ $sgn(r)=sgn[q+D(n)]$ wherein sgn(x) is an operation for finding a sign of x.

Such signs corresponding to the obtained interpolated values are sequentially output correspond to the output h of the limiter (refer to FIG. 2).

The interpolation function limiter 45 for obtaining such a limiter output h, when using the signal (e−f) of the detection outputs e and f for example, may comprise a subtracter 451 for performing the above (e−f) calculation, an 8-bit delay register 452, an adder 453 for finding the point q, two sign calculators 454 and 455 for finding the points p and r respectively, and a parallel/serial converter 456, as shown in FIG. 5.

The interpolation output h of the interpolation function limiter 45 is then applied to the band pass filter 46. As has been mentioned above, the output h of the interpolation function limiter 45 is obtained by subjecting the detection output waveforms sampled with the frequency of twice or more the modulation frequency to the interpolating operation with respect to one or more data points between adjacent two samples of the waveform and by generating a binary rectangular wave on the basis of the interpolated signs.

That is, since the interpolation output h of the interpolation function limiter 45 is one binary bit, the digital band pass filter 46 as the subsequent stage can be configured with a one-bit-input type circuit. For example, the band pass filter can be realized in the form of such a circuit as shown in FIG. 6.

The circuit of FIG. 6 is required to include as its constituent elements a subtracter 461, delay registers 462 and 463, constant multipliers 464a–464e and adders 465a–465c. However, since it is only required to process a 1-bit input as mentioned above, the registers, adders and multipliers can be made highly small in size when compared with those in the prior art circuit required to process an 8-bit input.

Such a digital band pass filter 46 can eliminate unnecessary band components other than the frequency of above BTR pattern to allow reliable extraction of the BTR pattern.

When there is present a phase error in the judgement timing clock signal l, the output i of the digital band pass filter 46 also reflects the phase error.

In accordance with the present invention, such a phase error is eliminated through the cooperation of the phase error detector 47 and clock reproducer 48. The principle of the phase correcting operation will be explained by referring to parts (a) to (d) of FIG. 7.

When such a signal (e–f) as shown, e.g., in part (a) of FIG. 7 based on the detection outputs e and f is processed by the interpolation function limiter 45, such a binary rectangular wave output h as shown by a solid line in part (c) of FIG. 7 is obtained on the basis of such a current judgement timing clock signal l as shown in part (b) of FIG. 7. When the output h is passed through the digital band pass filter 46, such a waveform output i as shown by a solid line in part (d) of FIG. 7 is obtained.

When the output i of part (d) of FIG. ) is compared with the signal (e–f) of part (a) of FIG. 7, its zero-crossing points are clearly shifted, which leads to generation of an error in its judgement result.

This error can be removed when the current judgement timing clock signal l is subjected to a phase modification so as to be sampled at points at which the amplitude of the detection signal as the sinusoidal wave becomes maximum.

When such phase control is carried out, the signs of the detection output (e–f) are as shown by a dotted line in part (c) of FIG. 7. When the signal (e–f) is further passed through the digital band pass filter 46, such a signal waveform as shown by a dotted line in part (d) of FIG. 7 is obtained and coincides with the detection output (e–f) of part (a) of FIG. 7, thus eliminating the phase error.

In accordance with the present invention, the phase control of the judgement timing clock signal is carried out in such a manner that the phase error detector 47 detects a phase error in the current judgement timing clock signal l on the basis of the output i of the band pass filter 46 and further the clock reproducer 48 eliminates that phase error.

FIG. 8 shows a block diagram of an example of the phase error detector 47 in accordance with the present invention, which includes a delay circuit 471, a sign comparator 472, a counter 473 and a judger 474.

Explanation will be made as to the operation of the phase error detector 47 by referring to a timing chart shown in parts (a) to (e) of FIG. 9.

Applied to the phase error detector 47 are the judgement timing clock signal (symbol clock signal) l and the interpolation clock signal n from the clock reproducer 48.

In this case, the symbol clock signal l has such a waveform as shown in part (b) of FIG. 9 and has a period corresponding to twice the sampling clock signal m of part (a) of FIG. 9. Further, the interpolation clock signal n has a period corresponding to ⅛ of the symbol clock signal l as shown in part (c) of FIG. 9.

The counter 473 of the phase error detector 47 counts the interpolation clock signal n at intervals of 8 clocks in the interpolation clock signal n on the basis of a load signal inputted at every falling edge of the symbol clock signal l to obtain a counted value, and outputs the counted value (see part (d) of FIG. 9) to the judger 474.

Meanwhile, the output i of the band pass filter 46 is sent to the sign comparator 472 to be sign-compared therein with the one-timing-previous output delayed by the delay 471.

In this case, when the sign comparator 472 has different sign inputs, the comparator outputs a pulse signal (see part (e) of FIG. 9) indicative of its comparative judgement result.

The judger 474 seizes the counted value of the interpolation clock signal n given from the counter 473 at the timing when receiving the output pulse signal from the sign comparator 472, and outputs the seized value as the phase error signal j. In the illustrated example, through the aforementioned processing, the counted value "1" is output as the phase error signal j.

The phase error signal j is next sent to the clock reproducer 48, which in turn corrects the phase of the judgement timing clock signal l so as to eliminate the received phase error j.

The clock reproducer 48 may include a clock selector 481 which has, as shown in FIG. 10 for example, a shift register 4811, a selector 4812, and an accumulative adder 4813.

In the clock reproducer 48, a symbol clock signal $l_0$, which is obtained by the frequency divider 49 dividing the clock signal k received from the oscillator 5 with respect to frequency, is applied to the shift register 4811.

The shift register 4811 sequentially shifts the symbol clock signal $l_0$ on the basis of the received interpolation clock signal n and outputs it to the selector 4822. As a result, outputs of respective shift stages of the shift register 4811 have such waveforms sequentially shifted in phase by an amount corresponding to one timing clock of the interpolation clock signal n as shown in parts (a)n to (h) of FIG. 11.

Applied to the accumulative adder 4813 of the clock reproducer 48 is the phase error signal j from the phase error detector 47.

The accumulative adder 4813 accumulatively adds the phase error signal j to obtain an added value and outputs the added value to the selector 4812.

The selector 4812 outputs one of the output signals of the shift stages corresponding to the added value received from the accumulative adder 4813 as the judgement timing clock signal l after the phase correction.

This, in the case where the previous value of the phase error signal j is "3" and the current value thereof is "1" for example, causes the clock signal of the shift stage "4" to be output.

Through such a series of operations in the clock reproducer 48 as mentioned above, the phase of the judgement timing clock signal l is corrected to establish demodulation timing synchronized with the BTR pattern transmitted from the transmitter side.

The clock reproducer 48 also includes circuits 481b and 481c each of which has the same structure as the clock selector 481a provided for the interpolation clock signal n and the sampling clock signal m to perform phase control over these clock signals n and m in accordance with the phase error j.

In this way, the present invention is arranged to subject the detection output sampled with the frequency corresponding to twice the modulation frequency to an interpolating operation of one or more points between adjacent two data samples thereof and to perform phase correction over the current judgement timing clock signal in accordance with a phase error between the binary rectangular wave generated based on the signs of the interpolated data and the current judgement timing clock signal.

In accordance with the present invention, a synchronizing signal having phase information equivalent to one obtained when sampled with a frequency corresponding to, e.g., 8 times the modulation frequency, can be obtained through the 3-point interpolating operation of the detection output sampled with the frequency corresponding to twice the modulation frequency with respect to 3 points between adjacent data of the detection output.

In the present invention, that is, an error detection accuracy for the phase control of the judgement timing clock signal at a certain sampling rate can be obtained from the sampling result with a sampling rate lower than that certain sampling rate. In other words, for obtaining the same error detection accuracy, it is only required to use a lower sampling rate.

As already explained in connection with the foregoing embodiment, the baseband demodulator in accordance with the present invention is designed so that the interpolation function limiter 45, band pass filter 46 and phase error detector 47 are operated based on the clock signal of the frequency 8fb, while the A/D converters 41 and 42 are operated based on the clock signal of the frequency 2fb.

Accordingly, each of these A/D converters 41 and 42 may comprise a circuit to be operated at an operational speed lower than the circuit operated based on the clock signal of the frequency 8fb, which leads to the fact that the delay detector 43 can be operated at an operational speed corresponding to the frequency 2fb, whereby the power consumption can also be remarkably reduced when compared with that of the arrangement using a circuit operable with the frequency 8fb.

Further, in accordance with the present invention, since the band pass filter 46 is of a 1-bit input type, the band pass filter can comprise such adders, constant multipliers and delay registers as arranged to have an input of a less number of bits when compared with those designed for 8-bit input, the band pass filter can be arranged in the form of a small scale circuit when compared with the prior art band pass filter.

In the present invention, in addition, since the linear interpolation method for finding only signs is employed as the above interpolation calculation, the interpolation function limiter per se can also be made small in size. Even when the 1-bit-input band pass filter 6 is also employed in addition to the above, the clock synchronization circuit itself can be made to have the same size as the prior art.

The present invention has an advantage from the foregoing disclosure that, when the invention is applied to a small-size portable communication apparatus, its power consumption and size can be made both small while keeping a high accuracy of phase error control of the judgement timing clock signal.

It will be appreciated that the present invention can be modified in various ways without departing from the spirit and scope of the invention as defined in the appended claims. For example, the sampling rate is not limited to twice the modulation frequency and the number of interpolation points is also not restricted to the above 3.

What is claimed is:

1. A clock synchronization circuit for use in a baseband demodulator wherein a baseband signal modulated based on a 4-value digital modulation system is sampled at a rate corresponding to twice a modulation rate or more to be converted into a digital data signal, the digital data signal is detected to obtain a detection output, and the detection output is judged based on a judgement timing clock signal to obtain a demodulation data signal, the clock synchronization circuit comprising:

an interpolation function limiter for subjecting the detection output to an interpolating operation with respect to at least one point between adjacent two sample points of the detection output to output interpolated point data as interpolation value data of one bit indicative of a positive or negative value;

digital band pass filter of one bit input type tuned to a modulation frequency for band-limiting an output of the interpolation function limiter;

a phase error detector for detecting a phase error in the judgement timing clock signal on the basis of an output of the digital band pass filter; and a clock reproducer for dividing a clock signal received from an oscillator with respect to frequency to generate the judgement timing clock signal and for controlling a phase of the judgement timing clock signal on the basis of a phase error signal received from the phase error detector.

2. A clock synchronization circuit as set forth in claim 1, wherein the interpolation function limiter comprises a circuit which outputs a binary rectangular wave signal as the interpolation value data signal on the basis of a sign at the interpolation point between the adjacent two sample values of the detection output.

3. A clock synchronization circuit as set forth in claim 1 or 2, wherein the interpolation of the interpolation function limiter is linear interpolation and the number of the interpolation points is set to be three.

4. A clock synchronization circuit as set forth in any one of claims 1 to 2, wherein the interpolation of the interpolation function limiter is carried out over either one of the detection outputs of the orthogonal two baseband signals or over a signal indicative of a difference between both of the detection outputs.

5. A clock synchronization circuit as set forth in claim 1, wherein the clock reproducer divides the clock signal received from the oscillator with respect to frequency, generates an interpolation timing clock signal for the interpolation function limiter and a bit rate clock signal for an A/D converter, and also performs phase control over the both clock signals on the basis of the phase error signal received from the phase error detector.

6. A clock synchronization circuit as set forth in claim 1, wherein the digital band pass filter comprises a recursive digital filter.

7. A clock synchronization circuit as set forth in claim 1, wherein the phase error detector comprises a circuit which outputs the phase error signal as a counter value corresponding to change points of the signs of an output of the digital band pass filter.

8. A clock synchronization circuit as set forth in claim 7, wherein the clock reproducer includes a shift register for sequentially shifting a symbol clock signal for the judgement timing clock signal across a plurality of outputs, means for accumulatively adding the phase error signal to obtain an accumulatively added value, and means for selecting as the judgement timing clock one of the outputs of the shift register corresponding to the accumulatively added value.

9. A clock synchronization circuit for use in a baseband demodulator wherein a baseband signal modulated based on a digital modulation system is sampled at a rate corresponding to twice a modulation rate or more to be converted into a digital data signal, the digital data signal is detected to obtain a detection output, and the detection output is judged based on a judgement timing clock signal to obtain a demodulation data signal, the clock synchronization circuit extracting a phase component from a demodulation synchronization signal and controlling a phase of the judgement timing clock signal to perform demodulating operation in synchronism with the demodulation synchronization signal, the clock synchronization circuit comprising:

signal generation means for subjecting the detection output to an interpolating operation with respect to at least one point between adjacent two sample values of the detection output to obtain interpolation value data, and for generating, on the basis of the interpolation value data, the demodulation synchronization signal containing phase information equivalent to one obtained when sampled at the rate corresponding to twice the modulation rate or more;

phase error detection means for detecting a phase error between the demodulation synchronization signal generated by the signal generation means and the judgement timing clock signal; and phase control means for performing phase control over the judgement timing clock signal with use of the phase error detected by the phase error detection means.

10. A clock synchronization circuit as set forth in claim 9, wherein the digital modulation system is a 4-value digital modulation system.

11. A clock synchronization circuit as set forth in claim 9 or 10, wherein the interpolation between the two sample values is carried out based on 3-point linear interpolation to generate a demodulation synchronization signal having phase information equivalent to one obtained when sampled at a rate corresponding to eight times the modulation rate.

12. A clock synchronization circuit as set forth in claim 9 or 10, wherein the signal generation means comprises an interpolation function limiter which subjects the detection output to an interpolating operation with respect to at least one point between adjacent two sample values of the detection output to obtain interpolation value data, and subjects the interpolation value data to a limiting operation to output as data of a one-bit interpolation value.

13. A clock synchronization circuit as set forth in claim 9 or 10, wherein a digital band pass filter of a one-bit input type tuned to a modulation frequency is provided between the signal generation means and the phase error detection means.

14. A clock synchronization circuit as set forth in claim 9 or 10, wherein a clock signal received from an oscillator is divided with respect to frequency to generate an interpolation clock signal for the signal generation means and a bit rate clock signal for the A/D converter together with the judgement timing clock signal and also to perform phase control over both of the clock signals on the basis of the phase error received from the phase error detection means.

15. A clock synchronizing method in a digital demodulator wherein a baseband signal modulated based on a 4-value digital modulation system is sampled at a rate corresponding to twice a modulation rate or more to be converted to a digital data signal, the digital data signal is detected to obtain a detection output, and the detection output is judged based on a judgement timing clock signal to obtain a demodulation data signal, the the clock synchronizing method comprising:

an interpolation step of subjecting the detection output to an interpolating operation with respect to at least one point between adjacent two sample points of the detection output to output interpolated point data as interpolation value data of one bit indicative of a positive or negative value;

a band limitation step of subjecting the interpolation value data to a band limiting operation by means of a digital band pass filter tuned to a modulation frequency;

a phase error detection step of detecting a phase error in the judgement timing clock signal on the basis of an output of the digital band pass filter; and a phase control step of controlling a phase of the judgement timing clock signal with use of the phase error, wherein a phase component of a demodulation synchronization signal is extracted with use of an interpolation value of sampling data at a certain sampling rate to perform synchronization control with a phase error accuracy equivalent to a sampling result at a sampling rate higher than the certain sampling rate.

16. A clock synchronizing method as set forth in claim 15, wherein the interpolation step is carried out by outputting as the interpolation value data a binary rectangular wave based on a sign of the at least one interpolation point between the adjacent two sample values of the detection output.

17. A clock synchronizing method as set forth in claim 16, wherein the interpolation of the interpolation step is carried out based on a 3-point linear interpolation.

18. A clock synchronizing method as set forth in claim 15, wherein the interpolation step is carried out by subjecting either one of the detection outputs of orthogonal two baseband signals or a signal indicative of a difference therebetween to the interpolating operation.

19. A clock synchronizing method as set forth in claim 15, wherein a clock signal received from the oscillator is divided with respect to frequency to generate an interpolation clock signal in the interpolation step and a bit rate clock signal for the A/D converter in addition to the judgement timing clock signal and also to perform phase control over both of the clock signals on the basis of the phase error signal in the phase error detection step.

20. A clock synchronization circuit as set forth in claim 3, wherein the interpolation of the interpolation function limiter is carried out over either one of the detection outputs of the orthogonal two baseband signals or over a signal indicative of a difference between both of the detection outputs.

\* \* \* \* \*